No. 634,121. Patented Oct. 3, 1899.
T. L. MYERS.
END GATE FASTENING FOR WAGONS.
(Application filed Apr. 3, 1899.)
(No Model.)
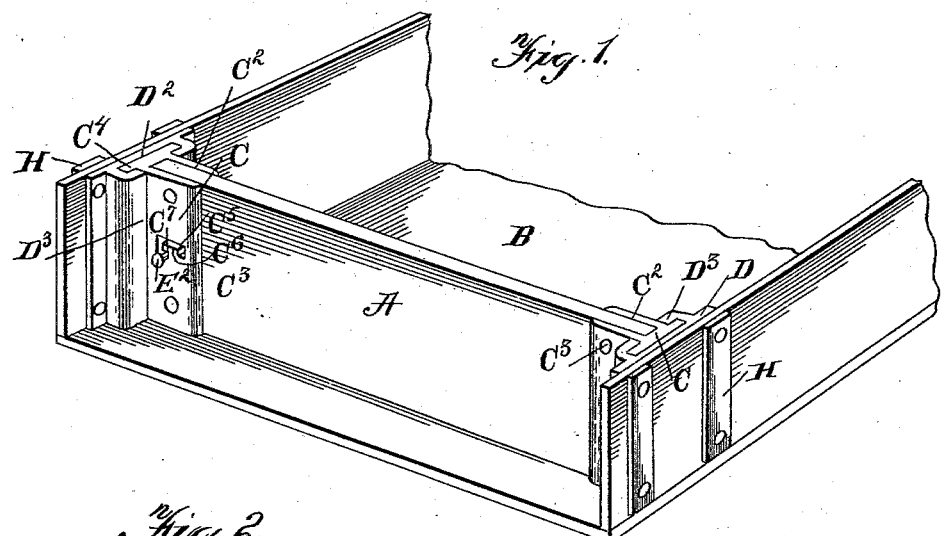
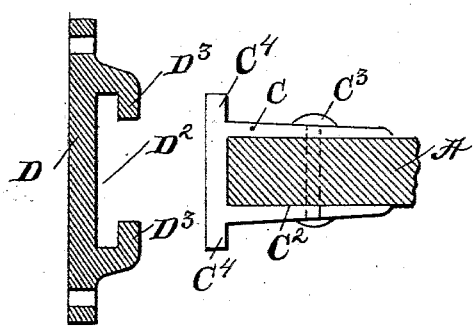
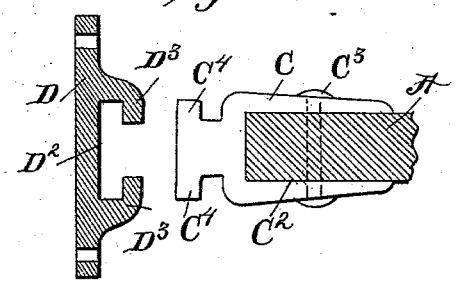
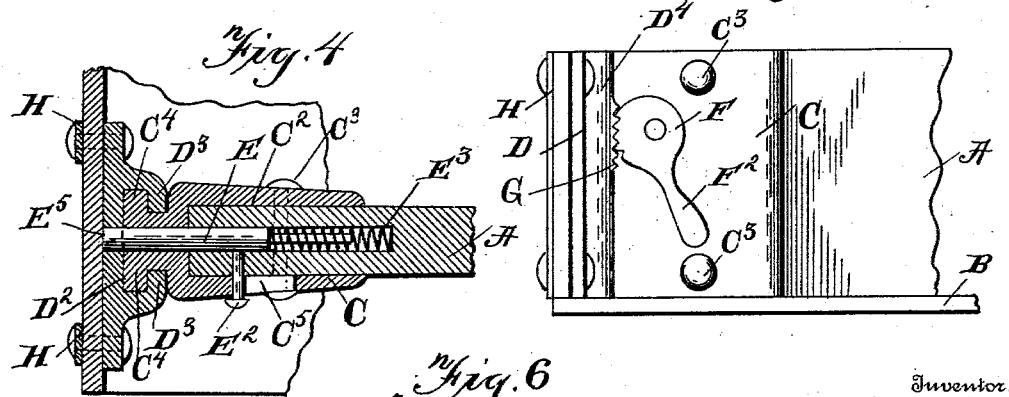
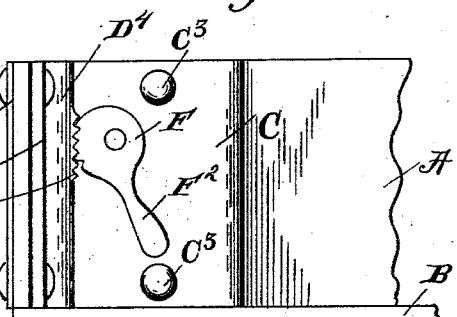
Witnesses: Geo. S. Frech, N. L. Collamer.
Inventor: Thomas L. Myers, by S. A. Haseltine, Attorney.

UNITED STATES PATENT OFFICE.

THOMAS L. MYERS, OF PLEASANT HOPE, MISSOURI.

END-GATE FASTENING FOR WAGONS.

SPECIFICATION forming part of Letters Patent No. 634,121, dated October 3, 1899.

Application filed April 3, 1899. Serial No. 711,619. (No model.)

*To all whom it may concern:*

Be it known that I, THOMAS L. MYERS, a citizen of the United States, residing at Pleasant Hope, in the county of Polk and State of Missouri, have invented certain new and useful Improvements in End-Gate Fastenings for Wagons; and I do hereby declare the following to be a full, clear, and exact description of the invention, such as will enable others skilled in the art to which it appertains to make and use the same.

My invention relates to improvements in end-gates for wagons, the object of which is to make a gate that will strengthen the wagon-box, while making the end perfectly tight and one easily removed when desired, also a gate that is simple in construction and avoids the necessity of ordinary cleats and rods, and one that is secured so as to prevent its losing out. Said device may be any desired size. These objects I attain by means of the device hereinafter explained and specifically claimed, which invention is illustrated in the accompanying drawings, forming a part of this specification, in which—

Figure 1 is a view in elevation of the end of a wagon-box, showing the device attached. Fig. 2 is a detail showing the end clamps. Fig. 3 is a modification of said clamps. Fig. 4 is a detail of the male portion of the clamp, which is secured to the end-gate of the wagon-box. Fig. 5 shows a modification of the device for holding the same by means of a rack and pawl. Fig. 6 is a detail view of the bolt E.

Similar letters of reference indicate corresponding parts in the several figures.

A is an ordinary board for forming the end-gate of the wagon-box B. To the ends of said board are secured the male portion of the fastening of the clamp C. Said clamp C is made with an opening $C^2$ for receiving the board which forms the end-gate, the said end-gate being secured in said clamp by means of bolts or rivets $C^3$. This clamp also strengthens the end-gate and prevents it from splitting. Said clamp is provided with a head or projections $C^4$ for entering the groove $D^2$ in the female portion of the clamp or fastening D. Said portion of the clamp D is bolted or riveted to the inner portion of the side pieces of the wagon-box, and is formed with the two projections $D^3$ to closely fit around and hold the head or projections $C^4$ of the male portion of the fastening. The male portion of the fastening C is provided with a slot in the side $C^5$, having a tongue $C^6$ with a projection $C^7$. It is for receiving the thumb-piece $E^2$, having a suitable head with a neck to work in the said slot, said thumb-piece being secured to a bolt E for operating the same. Said bolt passes through a hole in the male portion in the fastening to enter a similar hole in the female portion of the fastening D for holding the same firmly in position. Said bolt E is provided with a spring at the back end $E^3$ for holding the same forward, and the lower side of the projecting end $E^4$ is beveled for permitting the end-gate to be easily pushed down to position, the upper edge $E^5$ being straight, so that when the end-gate is in position the bolt will firmly hold it.

Fig. 5 illustrates another method which I have used for securing the end-gate in position, F being a pawl provided with cogs and hinged to the male portion of the fastening C and G being a rack or cogs on the female portion of the fastening. The pawl has an arm $F^2$ for operating the same, which is weighted or made heavy to keep it down in position.

Fig. 3 illustrates a modification of the male portion of the fastening to form a smaller head $C^4$ when desired.

H is an iron cleat on the outer portion of the side pieces of a wagon-box, through which the bolts or rivets of fastening D are secured, thus preventing the splitting of the side pieces and securing firmly the back end of the wagon-box, as described.

Having thus described my invention, what I claim as new, and desire to secure by Letters Patent, is—

1. In an ordinary wagon-box, side pieces provided with a female fastening, D, having a rack or cogs, G, combined with an end-gate having a male fastening C, and a pawl, F, provided with a weighted arm $F^2$ substantially as and for the purpose specified.

2. An end-gate fastening consisting of female fastenings, D, secured to the side pieces of the wagon and male fastenings C, secured to the end-gate; combined with a rack, G, having cogs on the female portion of the fastening; and a hinged pawl F, secured to the male portion of the fastening, said pawl having a weighted arm $F^2$, for drawing the endgate down and holding it in position, all substantially as shown and described for the purpose specified.

In testimony whereof I affix my signature in presence of two witnesses.

THOMAS L. MYERS.

Witnesses:
S. A. HASELTINE,
M. L. HASELTINE.